July 31, 1962  D. L. TAYLOR ET AL  3,047,301
STATIC SEALING ASSEMBLY
Filed Feb. 12, 1960
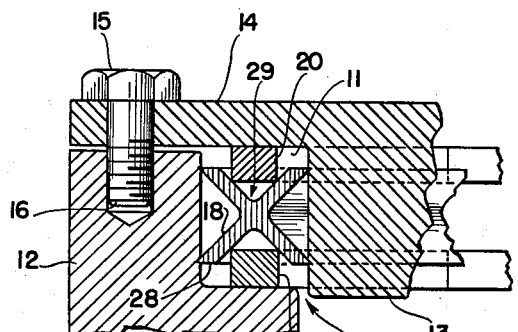
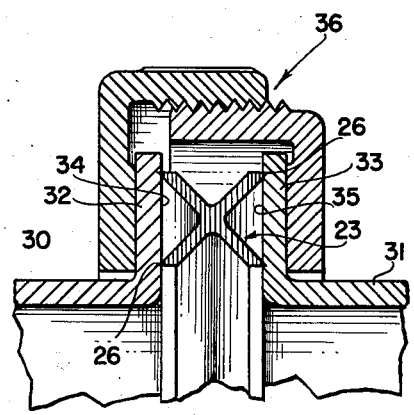
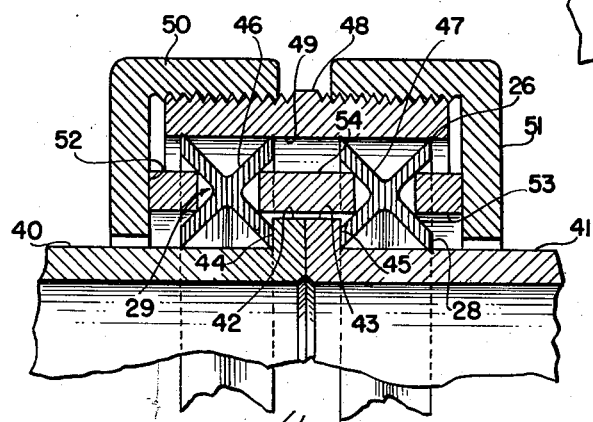
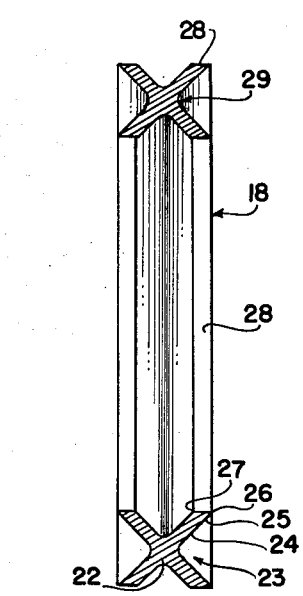
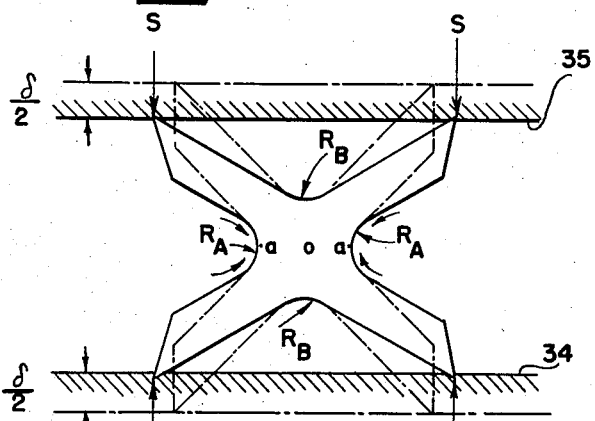
INVENTORS
DONALD L. TAYLOR
DOUGLAS G. THOMPSON
By George C. Sullivan
Agent United States Patent Office 3,047,301
Patented July 31, 1962

3,047,301
STATIC SEALING ASSEMBLY
Donald L. Taylor, Glendale, and Douglas G. Thompson, Los Angeles, Calif., assignors to Lockheed Aircraft Corporation, Burkbank, Calif.
Filed Feb. 12, 1960, Ser. No. 8,460
6 Claims. (Cl. 277—117)

This invention relates to sealing assemblies and more particularly to a static seal for connecting one element to another element, such as tubes for example, for use in fluid systems, either liquid or gas, whereby a rigid connection is effected, employing all metal construction and having full foliate-type seals as sealing members.

The primary object of the present invention is to provide a sealing assembly between two connected parts which is capable of maintaining a fluid tight seal between the parts under conditions of extremely high temperature and pressure.

Another object of the present invention is to provide a sealing assembly which does not require close tolerances or finish of mating surfaces.

Still a further object of the present invention is to provide a sealing assembly which is of all metal construction having inherent restoring forces or capability which can compensate for fluctuating temperature and pressure gradients.

A further object of the present invention is to provide a sealing assembly between two connected parts which is substantially symmetrical and thus cannot be inadvertently installed improperly.

Another object of the present invention is to provide a sealing assembly which does not rely upon internal pressurization and thereby, prevents air entry into the internal system and makes a good vacuum seal.

These and other objects and advantages of the invention will be noted from the following detailed description of the preferred embodiments of the invention as shown in the accompanying drawings.

FIGURE 1 is a cross sectional view of an over-all sealing gland incorporating one embodiment of the sealing assembly in the present invention;

FIGURE 2 is a cross sectional view of the metal seal per se employed in the sealing assembly of FIGURE 1;

FIGURE 3 is a sectional view of another embodiment of the present invention employed in a static coupling application;

FIGURE 4 is a sectional view of another embodiment of the present invention; and FIGURE 5 is an enlarged sectional view of the seal employed in FIGURE 4 diagrammatically showing resiliency of seal legs.

With reference to FIGURE 1, a typical embodiment of the present invention employing a static metallic sealing assembly is shown. FIGURE 1 shows a sealing assembly 10 installed in a chamber 11 provided in a coupling for the assembly. The coupling comprises a pair of members 12 and 13 wherein member 13 incorporates an extension 14 integral therewith through which a bolt 15 is passed into engagement with member 12 for providing the necessary axial force to effect sealing. Member 12 is provided with an internal bore 16 which is provided with suitable threads for engaging the threads on bolt 15. It can be assumed that members 12 and 13 form a part of a coupling which is associated with a pair of tubes, for example, through which hot gases are transmitted and wherein the coupling including members 12 and 13 provide the attaching means for adjacent ends of tubing.

Sealing assembly 10 comprises, in one form of the invention, a metal sealing ring 18 disposed between a pair of annular metal loading rings 20 and 21 of square cross section. Loading ring 20 is disposed between member 12 and the sealing ring and ring 21 is disposed between member 13 and the sealing ring. The loading rings are shown as separate and individual members but, if desired, these members may be integrally formed with members 12 and 13.

With respect to FIGURE 2, the sealing ring 18 is shown to comprise a central body portion 22 and a plurality of legs 23 integrally formed with body 22 and radiating outwardly therefrom. The general cross section of the ring takes form of an X. Sometimes the legs are referred to in common practice as "foils" or the ring of this configuration is sometimes generally known as a "quatrefoil seal." It is to be noted that each leg 23 includes a knee 24 and a foot 25 having a sharp toe 26 and a heel 27. It is noted that each foot of a leg or foil 23 includes an annular sole 28 which defines the inside diameter of the seal and the outside diameter thereof. It is an important feature of applicants' invention that the toe is sharply pointed so that when the assembly is properly installed, the sharp toe of each leg will embed itself into the engaging surfaces of members 12 and 13 respectfully. The quatrefoil seal is preferably made from metal, such as stainless steel, with or without a wear resistant plating as tungsten carbide flame plating, for example. This material and plating provides the surfaces of the seal ring with a highly polished smooth hard and durable surface finish. The general cross section of sealing ring 18 is uniform throughout its annular dimension and its X configuration. Between the legs, there is formed a V shaped valley, such as valley 29 which receives a loading ring in assembly. The corners of the loading ring engage the legs about the knee area of the legs.

With respect to the embodiment of FIGURE 3, the sealing ring 18 is employed between two opposite ends of tubing 30 and 31. Each end of tubing is provided with an annular flange 32 and 33 respectfully, between which sealing ring 18 is placed. The two flanges offer opposing inner surfaces 34 and 35 into which the toes 26 of each leg 23 of the sealing ring engage or are embedded slightly therein. Firm engagement of the sealing ring with the flanges is achieved by a locking nut arrangement 36 which places a compressive load on the sealing ring parallel to the central axis of the tube. This axial load is adjustable by rotating the members of the nut arrangement 36 so that more or less compressive load may be maintained on the sealing ring 18. In the embodiment of FIGURE 3, it is noticed that the sealing ring 18 may be employed without the use of loading rings such as those rings shown in FIGURE 1 as rings 20 and 21.

With reference to the embodiment shown in FIGURE 4, opposing ends of pipe or tubing 40 and 41 are provided with angular opposing and abutting flanges 42 and 43 respectively. These flanges are shown arranged in abutting engagement and offering external surfaces 44 and 45 which cooperate with the annular sole 28 of sealing rings 46 and 47. This sealing surface in conjunction with the sole of each ring forms a face seal between the tube ends. A collar 48 is provided having an internal bore 49 which engages with the toe of at least two outer legs of each sealing ring opposite to the leg forming the face seal. The toes of these legs form the outside diameter of the sealing ring and are caused to be embedded within the collar 48 within bore 49 by means of axial loading members 50 and 51 threadably engageable with the exterior collar of 48.

The two legs forming the outer diameter of each sealing ring and legs defining the inner diameter are forced into engagement with the bore 49 of the collar and the outside diameter of each tube 40 and 41 by means of a loading ring arrangement which comprises a pair of outside loading rings 52 and 53 which are disposed between end members 50 and 51 of the nut arrangement and each sealing ring 46 and 47. Each outside loading ring is positioned within a valley 49 separating two adjacent legs of each sealing ring and arranged in such a manner that the corners of the sealing rings engage about at the knee position of their respective legs of the sealing ring. The loading ring arrangement also includes an elongated ring 54 which is disposed above the outer diameter of flanges 44 and 45 and engages a pair of legs from each sealing ring 46 and 47 in such a manner that the corners of the loading ring 54 engage each respective leg about its knee position.

Therefore, it is easily seen that by rotating nut members 50 and 51 on collar 48, a compressive load is placed on the legs of each sealing ring 46 and 47 by the loading ring arrangement 52, 53 and 54 such that the two legs defining the outer diameter of each loading ring will cause their respective sharply pointed toes to embed with the surface of bore 49 and the toes of the inner legs defining the inside diameter of each sealing ring are embedded with the outer diameter of each tube member 40 and 41 respectively. Furthermore, the compressive loading will also cause a face seal to occur between the sole of one of the legs forming the inner diameter of each loading ring and its mating flange provided on tube members 40 and 41. In this fashion it is possible to obtain four points of contact defining a circumferential seal and a single point associated with each sealing ring defining a face seal.

With reference to the embodiment shown in FIGURE 1, the annular seal 18 is installed in the cavity 11. The seal is cruciform in cross section and is installed between two loading rings 20 and 21. When the hold-down bolt 15 is tightened into member 12, the extension 14 of member 13 applies a compressive load to the two loading rings and the seal as an assembly and this load is resisted by member 12. The compressive forces developed in this manner cause the sharp points or toes 28 of each leg of the seal to move radially and to bite into the adjacent surfaces of the members 13 and 12 circumferentially and thus cause a seal to be effected. A permanent spring load is obtained which maintains the seal in place since the corners of the loading rings which are projected into the valleys of the sealing ring engage each associated leg approximately at its knee position. Therefore, as the loading rings are compressed, the legs have a tendency to bow to provide spring action.

The action of the loading rings and the legs of the sealing ring shown in FIGURE 4 is similar to that described above with reference to the embodiment shown in FIGURE 1.

FIGURE 3 shows another form of the seal 18 installed between flat surfaces 34 and 35 without loading rings as employed in the embodiments in FIGURES 1 and 4. The seal is provided with feet having sharpened, chiselled or pointed toes providing upper and lower sealing areas. When the nut arrangement 36 is tightened, a compressive load is supplied to the seal which causes the legs to move as shown diagrammatically in FIGURE 5. The neutral axis of the seal, indicated by "O" undergoes no change during this application of load, and thus remains unstressed; however, it is noted that the internal radii $R_A$ in the transverse plane become reduced by an amount proportional to the closure effected by the tightening of the nut arrangement 36 while, similarly, the radii $R_B$ in the axial plane increases.

The reduction of radii $R_A$ produces a compressive stress in these areas which is at a maximum at the point $a$, while at the same time the increase of radii $R_B$ produces a tensile stress in the areas affected which, in this case, is a maximum at the point $b$.

Both these stresses, occurring by choice within the elastic limit of the material employed, cause the sealing forces S to be applied to the members which are to be sealed against, and it is important to note that these stresses occur simultaneously and thus there are two sets of forces tending to maintain sealing.

Therefore, in the quatrefoil seal configuration, there is a "double recovery" principle involved.

Although not a criticality, it may be advantageous in certain applications to provide a pre-groove at the points where the sharp toes are intended to seal so that the grooves will guide the toes during compression and in this instance, the toes will bottom in the groove.

As a result of this invention, a sealing ring assembly has been provided between two fluid containing parts which is liquid and gas tight under widely varying conditions of temperature and pressure. While only three embodiments of the present invention have been shown and described herein, it will be evident that various changes may be made in the construction and the arrangement of the parts without departing from the scope of the invention.

We claim:

1. A semi-flexible metal sealing assembly comprising: a packing chamber having two opposed planar walls; a metal sealing ring within said chamber compressed between said walls; said ring having a cruciform cross section including an annular central body having only two pairs of outwardly radiating solid deflectable legs, each of said legs having a sharp pointed toe, each pair cooperating with its respective planar wall; said pairs of legs upon compression of the seal ring being sufficiently flexed to cause the toes of each pair of legs to spread outwardly and bite into the respective wall to produce a tight sealing engagement under varying operating conditions; each of said walls extending a substantial distance on either side of the toes of each pair of legs and more than the distance of greatest travel of the toes along the wall when said legs are flexed; the flexure of said legs when under compression being sufficient to maintain tight sealing engagement of the toes with the wall surfaces under variable operating conditions caused by fluctuation of temperature and pressure; and means associated with the packing chamber to effect compression of the seal ring.

2. A semi-flexible metal sealing assembly as set forth in claim 1 wherein the radiating legs are separated by annular valleys which are curved at their convergent ends.

3. A semi-flexible metal sealing assembly comprising: a packing chamber having two opposed planar walls; a metal sealing ring within said chamber compressed between said walls; said ring having a cruciform cross section including an annular central body having only two pairs of outwardly radiating solid deflectable legs, each of said legs having a sharp pointed toe, each pair cooperating with its respective planar wall; said pairs of legs upon compression of the seal ring being sufficiently flexed to cause the toes of each pair of legs to spread outwardly and bite into the respective wall to produce a tight sealing engagement under varying operating conditions; each of said walls extending a substantial distance on either side of the toes of each pair of legs and more than the distance of greatest travel of the toes along the wall when said legs are flexed; the flexure of said legs when under compression being sufficient to maintain tight sealing engagement of the toes with the wall surfaces under variable operating conditions caused by fluctuation of temperature and pressure; annular valleys formed between each of the radiating legs; a loading ring ring disposed in each of the two opposite valleys formed between the legs; said loading rings engaging opposite walls of the packing chamber; said loading rings engaging the adjacent legs about midway between the central body of the sealing ring and the pointed toe of each leg; and means associated with each loading ring to urge the loading rings into engagement with the legs of the sealing ring so that the legs are flexed and the toes are pressed into tight sealing engagement with the walls of the packing chamber.

4. A semi-flexible metal sealing assembly as set forth in claim 3 wherein the annular valleys formed between the legs are rounded at their convergent ends.

5. A semi-flexible seal ring assembly comprising: a pair of conduits with outwardly extending radial flanges, the ends thereof which abut each other; each of the conduits having a smooth annular outer surface immediately behind the flanges; an adjustable coupling assembly surrounding the flanges and the outer surfaces to form an annular packing chamber, the coupling having an axially extending collar spaced from and concentric with the conduits and providing opposite the smooth annular surface of each conduit a smooth annular bore surface; the coupling assembly also having two opposed radially extending adjustable walls adjacent the ends of the collar which are axially adjustable with respect to each other; the coupling assembly and the conduits forming an annular packing chamber comprising two axially spaced seal receiving chambers immediately behind the flanges which are joined by an annular connecting passage; an annular metal sealing ring of cruciform cross section in each of the seal receiving chambers, said rings having an annular central body with two pairs of outwardly radiating, solid, deflectable legs, each of the legs having a sharp pointed toe; the toes of one pair of legs of each ring engaging the corresponding annular surface on the conduits and the toes of the other pair of legs of each ring engaging the corresponding opposing surface of the collar; one of the legs of the said one pair of legs of each ring engaging its corresponding flange; an annular loading ring concentrically positioned in spaced relation between the collar and the abutting flanges and extending into the valley of each sealing ring formed between the flange engaging leg and the adjacent leg of the collar engaging pair of legs; the loading ring engaging the legs about midway between the central body of the sealing ring and the pointed toe of each leg; an outer loading ring positioned in the valley of each of the sealing rings opposite to that occupied by the central loading ring and engaging the two remaining adjacent legs about midway between the central body of the sealing ring and of the pointed toe of these legs; the opposite walls engaging the outer loading rings so that upon adjustment of the coupling the outer loading rings are forced against the annular seals and the legs of each of the seals are thereby flexed so that the toes are forced against their engaged surface and embedded therein, the legs being sufficiently deflected to maintain tight sealing engagement under variable operating conditions caused by fluctuations of temperature and pressure; and means to adjust the relative axial displacement of the opposed walls.

6. A semi-flexible seal ring assembly comprising: two members to be sealed against leakage therebetween; an annular sealing chamber formed between said members; an annular semi-rigid metal seal ring of cruciform cross-section disposed in said chamber and having an annular central body with two pairs of resilient, deflectable legs extending therefrom, each of said legs having a sharp pointed toe; one pair of legs extending radially outward and the other pair of legs extending radially inward from the annular body of the ring; the annular sealing chamber having two aligned radially disposed axially continuous annular walls, one of the walls being on each of the members; one of said walls being engaged by one pair of legs and the other of said walls by the other pair of legs; the sharp pointed toes of the legs engaging the walls in annular line contact; means associated with the chamber and engaging the adjacent legs of each pair to deflect the seal ring legs axially toward each other, said deflection displacing the seal ring leg toes radially away from the annular body of the seal ring and against the chamber walls; the toes of the legs upon such deflection forcefully biting into the surface of the chamber walls to produce a tight sealing engagement therewith; the bite of the toes into the surface of the chamber being sufficient to maintain tight sealing engagement between the toes and the chamber surface walls under variable operating conditions caused by temperature and pressure fluctuation.

References Cited in the file of this patent

UNITED STATES PATENTS

| | | |
|---|---|---|
| 332,667 | Lyons | Dec. 15, 1885 |
| 622,534 | Preschlin | Apr. 4, 1899 |
| 830,392 | Wiedeman | Sept. 4, 1906 |
| 1,567,813 | Oleson | Dec. 29, 1925 |
| 1,965,273 | Wilson | July 3, 1934 |
| 2,521,692 | Costello | Sept. 12, 1950 |
| 2,604,507 | Tyson | July 22, 1952 |
| 2,700,561 | Svenson | Jan. 25, 1955 |
| 2,898,000 | Hanny | Aug. 4, 1959 |